United States Patent [19]
Brown et al.

[11] Patent Number: 5,888,287
[45] Date of Patent: Mar. 30, 1999

[54] WASHABLE FABRICS INK

[75] Inventors: Benjamin Brown; Corey Williams, both of Keene, N.H.

[73] Assignee: Markem Corporation, Keene, N.H.

[21] Appl. No.: 827,649

[22] Filed: Apr. 10, 1997

[51] Int. Cl.$^6$ ............................................. C09D 11/02
[52] U.S. Cl. .................... 106/31.58; 106/31.59; 106/31.86; 106/31.89
[58] Field of Search ................ 106/31.58, 31.59, 106/31.86, 31.89

[56] References Cited

U.S. PATENT DOCUMENTS

| | | | |
|---|---|---|---|
| 4,290,072 | 9/1981 | Mansukhani | 106/31.58 |
| 4,324,117 | 4/1982 | Schwob et al. | 239/102 |
| 4,395,287 | 7/1983 | Kobayashi et al. | 106/31.58 |
| 4,481,244 | 11/1984 | Haruta et al. | 428/155 |
| 4,544,580 | 10/1985 | Haruta et al. | 427/261 |
| 4,597,794 | 7/1986 | Ohta et al. | 106/31.6 |
| 4,702,742 | 10/1987 | Iwata et al. | 8/495 |
| 4,725,849 | 2/1988 | Koike et al. | 349/1.1 |
| 4,732,613 | 3/1988 | Shioya et al. | 106/31.27 |
| 4,926,190 | 5/1990 | Laver | 106/31.49 |
| 4,929,277 | 5/1990 | Tanaka et al. | 106/31.51 |
| 4,972,200 | 11/1990 | Arahara et al. | 346/1.1 |
| 5,010,125 | 4/1991 | Kruse et al. | 524/308 |
| 5,017,223 | 5/1991 | Kobayashi et al. | 106/31.58 |
| 5,019,835 | 5/1991 | Arahara et al. | 346/1.1 |
| 5,032,216 | 7/1991 | Felten | 156/628 |
| 5,073,448 | 12/1991 | Vieira et al. | 106/31.58 |
| 5,085,698 | 2/1992 | Ma et al. | 106/31.6 |
| 5,089,050 | 2/1992 | Vieira et al. | 106/31.58 |
| 5,096,781 | 3/1992 | Vieira et al. | 428/411.1 |
| 5,098,477 | 3/1992 | Vieira et al. | 106/31.58 |
| 5,104,448 | 4/1992 | Kruse | 106/31.58 |
| 5,112,398 | 5/1992 | Kruse | 106/31.58 |
| 5,118,570 | 6/1992 | Malhotra | 428/474.4 |
| 5,132,706 | 7/1992 | Yuasa et al. | 346/140 R |
| 5,142,306 | 8/1992 | Arahara et al. | 346/140 R |
| 5,143,546 | 9/1992 | Yuasa et al. | 106/31.58 |
| 5,156,675 | 10/1992 | Breton et al. | 106/31.27 |
| 5,160,535 | 11/1992 | Cooke et al. | 106/31.27 |
| 5,169,438 | 12/1992 | Matrick | 106/31.58 |
| 5,194,475 | 3/1993 | Kruse et al. | 524/308 |
| 5,205,861 | 4/1993 | Matrick | 106/31.47 |
| 5,211,747 | 5/1993 | Breton et al. | 106/31.43 |
| 5,250,121 | 10/1993 | Yamamoto et al. | 106/31.58 |
| 5,258,066 | 11/1993 | Kobayashi et al. | 106/31.58 |
| 5,261,953 | 11/1993 | Vieira et al. | 106/31.58 |
| 5,300,143 | 4/1994 | Schwarz, Jr. | 106/31.43 |
| 5,310,778 | 5/1994 | Shor et al. | 524/556 |
| 5,328,504 | 7/1994 | Ohnishi | 106/31.6 |
| 5,358,555 | 10/1994 | Argentero et al. | 106/31.25 |
| 5,358,558 | 10/1994 | Yamamoto et al. | 106/31.58 |
| 5,395,863 | 3/1995 | Burns et al. | 522/71 |
| 5,418,078 | 5/1995 | Desie et al. | 428/704 |
| 5,431,720 | 7/1995 | Nagai et al. | 106/31.58 |
| 5,468,553 | 11/1995 | Koike et al. | 428/224 |
| 5,484,475 | 1/1996 | Breton et al. | 106/31.58 |
| 5,489,503 | 2/1996 | Toan | 430/507 |
| 5,509,957 | 4/1996 | Toan et al. | 106/31.58 |
| 5,538,548 | 7/1996 | Yamazaki | 106/31.86 |
| 5,667,569 | 9/1997 | Fujioka | 106/31.58 |
| 5,743,945 | 4/1998 | Yamashita et al. | 106/31.58 |

FOREIGN PATENT DOCUMENTS

| | | |
|---|---|---|
| 408333 | 1/1991 | European Pat. Off. . |
| 514159 | 11/1992 | European Pat. Off. . |
| 688835 | 12/1995 | European Pat. Off. . |
| 5964678 | 4/1984 | Japan . |
| 170443 | 7/1996 | Japan . |

OTHER PUBLICATIONS

Applications/Protective Coatings, pp. 15–18, Dow Glycol Ether Handbook (no date).

*Primary Examiner*—Helene Klemanski
*Attorney, Agent, or Firm*—Baker & Botts LLP

[57] ABSTRACT

An ink jet composition exhibits a reduced tendency to smear upon application to a substrate. The ink composition includes a propylene glycol ether and/or a propylene glycol ether acetate, a surfactant and a colorant.

16 Claims, No Drawings

WASHABLE FABRICS INK

BACKGROUND OF THE INVENTION

This invention relates to ink jet compositions useful in jet printing applications, particularly "drop on demand" jet printing applications. More specifically, this invention is directed to ink jet ink compositions especially suitable for printing onto fabrics. The ink jet compositions provide low smear when applied to a substrate.

Typically, ink jet printing involves forming characters on a substrate by ejecting ink droplets from a printhead having one or more nozzles. In drop on demand ink printing systems ink droplets are expelled from a printing head when required during the printing process. The inks used must be sufficiently liquid so as to be easily ejected from the printing head. Unfortunately, due to the liquid consistency of the ink required for expulsion from the nozzle, agglomerates of the ink or puddles may form around the printhead orifices. These puddles may be of sufficient size so as to contact, and thus smear, the substrate and may even protrude into the printhead orifice hindering efficient ejection of ink and deflecting the ink from its desired trajectory to the substrate.

In addition, such puddling may provide problems during the purge step of the initial start up of the ink jet printer. Typically, ink is purged automatically from the printhead and runs down an ink jet faceplate. Generally, a narrow gap of less than 0.1 inches separates the faceplate from the substrates. Unfortunately, during the purging process conventional inks move down the faceplate in large droplets which eventually contact the substrate and deposit copious amounts of extraneous ink onto the substrate.

In view of such problems, it is desirable to provide an ink composite having a relatively high viscosity, i.e., at least 9 cps while at the same time, maintaining a relatively low surface tension.

The Kruse Patent No. 5,104,448 discloses ink jet compositions consisting of ethylene or propylene glycol ethers having low viscosity, i.e. about 5–6 cps which also have a high surface tension, i.e., greater than 25 dyne/cm.

In addition, Japanese application 59-64678 discloses ink jet compositions consisting of ethylene glycol ethers and surfactants having a surface tension below 25 dyne/cm and a preferred viscosity of less than 8 cps.

SUMMARY OF THE INVENTION

Accordingly, it is an object of the invention to provide an ink jet composition which overcomes the problems described above.

Another object of the invention is to provide an improved ink for ink jet printers that is easily transported and purged through ink jet printers.

These and other objects of the invention are attained by providing a jet ink composition comprising one selected from the group consisting of a propylene glycol ether, a propylene glycol ether acetate, a surfactant and a colorant.

DESCRIPTION OF THE PREFERRED EMBODIMENT

Ink compositions according to the invention which are suitable for use in ink jet printers typically have a surface tension less than 30 dynes/cm, preferably less than 25 dynes/cm, measured at 25° C. The ink composition according to the present invention are fluid and have a viscosity of 9 to 60 cps, preferably 10–35 cps at 40° C. when measured using a Brookfield Viscometer equipped with Spindle 18 which is rotated at 60 rpm.

An essential component of the present invention is a propylene glycol ether and/or a propylene glycol ether acetate. Suitable propylene glycol ethers and acetates include but are not limited to dipropylene glycol ethers and tripropylene glycol ethers. Examples of these ethers include but are not limited to propylene glycol methyl ether, dipropylene glycol methyl ether, propylene glycol methyl ether acetate, dipropylene glycol methyl ether acetate, propylene glycol n-butyl ether, dipropylene glycol n-butyl ether, tripropylene glycol n-butyl ether, propylene glycol phenyl ether and propylene glycol n-propyl ether. A preferred propylene glycol ether is tripropylene glycol methyl ether available from Dow Chemical under the designation Dowanol TPM.

The propylene glycol ether and/or propylene glycol ether acetate are present in the ink composition in the amount of greater than 50% by weight, preferably greater than 75% by weight of the ink composition.

In order to achieve the desired reduction of smear, the ink composition of the present invention includes a surfactant. Suitable surfactants include surfactants which are compatible with the other ink composition components, do not incorporate air into the composition and which do not foul printhead surfaces. Suitable surfactants include but are not limited to nonionic surfactants, preferably fluorosurfactants or silicone surfactants. Suitable fluorosurfactants include Fluorad FC 170-C, FC171, FC430 and FC431 available from 3M. A preferred fluorosurfactant is Fluorad FC-430 a polyalkoxyfluorinate. Suitable silicone surfactants include Silwet L-77, L-720, L-722, L-7001, L-7002, L-7087, L-7200, L-7210, L-7220, L-7230, L-7500, L-7600, L-7602, L-7036, L76-04, L-7605, L-7607 and L-7608 available from Union Carbide and Troysol Q-148 and S366 available from Troy Chemical. The surfactant is present in the composition in an amount sufficient such that the ink composition has a surface tension less than 30 dynes/cm, preferably less than 25 dynes/cm.

Suitable, coloring agents, present in an amount of at least 0. 1% to 15.0% by weight, preferably 3.0% to 9.0% by weight of the ink composition include pigments and dyes. Any dye or pigment may be chosen provided it is capable of being dispersed in the ink composition and is compatible with the other ink components. Any pigment particle should have a diameter of less than 1 micron.

Dispersing agents may be used to help suspend the pigment particles in the ink composition. Suitable dispersants include but are not limited to water soluble block copolymers of polyethers with an amine end group which attaches to acidic groups on pigment surfaces. A preferred dispersant is Solsperse 20000 Dispersant manufactured by Zeneca and available from United Color Technology, Inc. in Newton, Pa.

The ink jet compositions of the present invention are generally prepared by premixing the coloring agent, with dispersant if present in the composition, and mixing this premix together with the other ink ingredients until the resulting mixture is homogenous.

Specific embodiments of the jet ink compositions will now be described in detail. These examples are intended to be illustrative, and the invention is not limited to the materials set forth in these embodiments. All parts are by weight of the ink composition and all viscosities are measured at 40° C. using a Brookfield Viscometer equipped with spindle 18 which is rotated at 60 rpm unless otherwise indicated.

EXAMPLE 1

| Ingredient | Parts |
|---|---|
| Dowanol TPM | 85.58 |
| Solsperse 20000 Dispersant | 6.70 |
| Degussa FW 200 Carbon Black | 6.70 |
| Fluorad FC-430 Surfactant | 0.75 |

This ink composition had a surface tension of 22.5 dynes/cm and a viscosity of 18 cps, exhibited excellent reduced smear characteristics.

EXAMPLE 2

| Ingredient | Parts |
|---|---|
| Dipropylene glycol methyl ether acetate | 85.58 |
| Solsperse 20000 Dispersant | 6.70 |
| Degussa FW 200 Carbon Black | 6.70 |
| Fluorad FC-430 Surfactant | 0.75 |

This ink composition had a surface tension of 24.5 dynes/cm and a viscosity of 9 cps.

EXAMPLE 3

| Ingredient | Parts |
|---|---|
| Tripropylene glycol n-butyl ether | 85.58 |
| Solsperse 20000 Dispersant | 6.70 |
| Degussa FW 200 Carbon Black | 6.70 |
| Fluorad FC-430 Surfactant | 0.75 |

This ink composition had a viscosity of 33 cps and a surface tension of 22.7 dynes/cm.

Although the invention has been described herein with respect to specific embodiments, many modifications and variations therein will readily occur to those skilled in the art. Accordingly, all such variations and modifications are included within the intended scope of the invention.

We claim:

1. An ink jet composition for application to a substrate comprising at least one selected from the group consisting of a propylene glycol ether, a propylene glycol ether acetate and combination thereof, a surfactant selected from the group consisting of silicones, fluorosurfactants and combinations thereof, and a colorant, the ink composition having a reduced tendency to smear upon application to a substrate.

2. An ink jet composition according to claim 1 comprising a propylene glycol ether.

3. An ink jet composition according to claim 1 comprising a propylene glycol ether acetate.

4. An ink jet composition according to claim 2 wherein the propylene glycol ether is present in an amount of greater than 50% by weight of the ink composition.

5. An ink jet composition according to claim 1 comprising a fluorosurfactant.

6. An ink jet composition according to claim 5 comprising tripropylene glycol methyl ether.

7. An ink jet composition according to claim 1 comprising dipropylene glycol methyl ether acetate.

8. An ink jet composition according to claim 1 wherein the composition has a viscosity of at least 9 centipoise at 40° C. and a surface tension of less than 25 dynes/cm at 25° C.

9. An ink jet composition according to claim 6 wherein the composition has a viscosity of at least 9 centipoise at 40° C. and a surface tension of less than 25 dynes/cm at 25° C.

10. A method of preparing an ink jet composition having a reduced tendency to smear upon application to a substrate comprising the steps of:

providing at least one selected from the group consisting of a propylene glycol ether, a propylene glycol ether acetate and combination thereof, providing a surfactant selected from the group consisting of silicones, fluorosurfactants and combinations thereof, providing a colorant, and mixing together the at least one selected from the group consisting of a propylene glycol ether, a propylene glycol ether acetate and combinations thereof, the surfactant and the colorant.

11. A method according to claim 10 comprising providing a propylene glycol ether in an amount of greater than 50% by weight of the ink composition.

12. A method according to claim 11 comprising providing a propylene glycol ether acetate in an amount of greater than 50% by weight of the ink composition.

13. A method according to claim 10 wherein the surfactant is a fluorosurfactant.

14. A method according to claim 13 comprising providing tripropylene glycol methyl ether in an amount of greater than 50% by weight of the ink.

15. A method according to claim 10 wherein the ink jet composition has a viscosity of at least 9 centipoise at 40° C. and a surface tension of less than 25 dynes/cm at 25° C.

16. A method according to claim 14 wherein the ink jet composition has a viscosity of at least 9 centipoise at 40° C. and a surface tension of less than 25 dynes/cm at 25° C.

* * * * *